Patented Apr. 26, 1927.

1,625,929

UNITED STATES PATENT OFFICE.

JOHN C. WOODRUFF AND GROVER BLOOMFIELD, OF TERRE HAUTE, INDIANA, ASSIGNORS TO COMMERCIAL SOLVENTS CORPORATION, OF TERRE HAUTE, INDIANA, A CORPORATION OF MARYLAND.

CATALYST FOR SYNTHETIC-METHANOL PRODUCTION.

No Drawing. Original application filed May 26, 1926, Serial No. 111,884. Divided and this application filed October 25, 1926. Serial No. 144,166.

Our invention relates to the production of methanol by the high pressure catalytic combination of oxides of carbon with hydrogen, and pertains more directly to the preparation and employment of improved catalysts in the process.

Methanol may be produced by combining oxides of carbon with hydrogen in the presence of a suitable catalyst at elevated temperature and pressure. Carbon monoxide, carbon dioxide, and mixtures of the two oxides may be employed, these substances reacting with hydrogen according to the following reactions:—

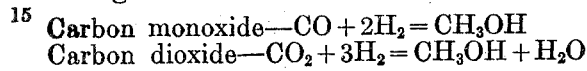

It is observed that when carbon dioxide is the oxide employed, one molecule of water is formed for each molecule of methanol produced. On the other hand when pure carbon monoxide is used, theoretically there is nothing produced by the reaction but methanol. Actually in practice pure carbon monoxide and pure carbon dioxide are both difficult to obtain economically, so that the methanol synthesis is carried out by reacting a mixture of carbon monoxide and carbon dioxide with hydrogen.

In addition to the reactions producing methanol there are, in the methanol synthesis, undesirable side-reactions which cut down the yield of the desired product. The principal side-reaction which may occur is the formation of methane, which is illustrated below:

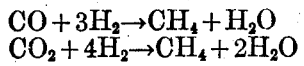

In addition to the methane side-reaction there are other side-reactions which sometimes occur in which there are produced esters, aldehydes, organic acids, ketones, and hydrocarbons other than methane, these reactions occurring as the result of the polymerization or condensation of methanol or its decomposition products.

When a gas mixture comprising carbon oxides mixed with an excess of hydrogen over the amount theoretically required to produce methanol is passed over a catalytic substance comprising metals or their oxides at a temperature above 250° C. there is nearly always produced some reaction between the gaseous components. The extent of this reaction depends to some degree on space velocity, temperature, and pressure, but the fact remains that under the conditions outlined, carbon oxides and hydrogen react to some extent in all cases.

The substances formed by such a process depend, both as to identity and as to amount, almost entirely on the nature and activity of the catalytic substance present. The methanol catalysts proposed in the past have been of two principal types:—i. e.—

1. Mixtures of finely divided metals, or what is equivalent, mixtures of easily reducible metal oxides;

2. Mixtures of oxides of metals non-reducible, or difficulty reducible under the conditions of the methanol synthesis.

In the past, also, one class of easily reducible metal oxides, that is the oxides of iron, nickel, and cobalt have been described as absolutely worthless for the production of methanol catalysts since these metals under normal conditions prevent the formation of methanol, the reactions producing only methane.

We have discovered a new type of catalyst which produces a higher yield of methanol than those formerly employed in the art, and at the same time produces a very pure methanol, uncontaminated by byproducts. An additional advantage accruing from the use of our catalyst is that the formation of methane in the process—with the consequent destruction of valuable hydrogen—is practically eliminated.

We have now discovered a new type of valuable methanol catalyst which comprises three main elements—i. e.

(1) One or more difficultly reducible metal oxides such as zinc, magnesium, cadmium, chromium, vanadium, tungsten, uranium, zirconium titanium, aluminium, manganese, molybdenum, thorium, cerium, etc.

(2) One or more easily reducible metal oxides such as copper, silver, iron, nickel, cobalt, etc.

(3) A metallic halide.

It will be observed that in our improved catalyst we may employ substances normally deleterious to the methanol reaction—namely the "methanating metals"—iron, nickel, or cobalt. In our improved compositions these normally deleterious substances serve advantageously, apparently exerting only a normal hydrogenating catalytic action productive of methanol. Or we may employ easily reducible oxides such as those of copper or silver which are already known in the art as advantageous components of certain methanol catalysts. In these cases however, our improved catalysts containing halides produce far better results than those known in the art for otherwise identical catalyst mixtures.

The precise method by which the metallic halides produce the improvement is not known to us. At least three theories may be used to account for the phenomenon—namely:—

(1) The metallic halide acts as an ordinary "promoter" in increasing catalyst activity.

(2) The metallic halide interacts with other metallic oxides present in the catalyst to produce oxychloride compounds which, in turn, either serve as catalyst promoters, or may so modify the purely physical state of the mass as to produce a more active catalyst;

(3) The metallic halide may be reduced by the high pressure contact with hydrogen and carbon oxides during the commencement of its use as a catalyst and the resultant finely divided metal may increase the catalytic activity, or alternatively, the metallic halide may first react with some other metal producing the halide thereof, which may be reduced in the same manner.

However, the precise explanation for the improved result attained by the addition of metallic halides to methanol catalysts is not known and forms no part of our invention.

To produce our improved catalysts it is not necessary that the amount of metallic halide added bear any exact weight relation to the remaining constituents of the catalyst, though the amount of halide added should preferably be less than one chemical equivalent of the amount of principal metallic oxide present in the catalyst.

As illustrative of our invention we will cite a number of examples which show the possible methods of preparing and employing the catalyst which we have discovered. In order to indicate the efficiency of our catalyst typical results obtained by its use are given below. In giving these specific examples it is our intention only to thus display the catalyst efficacy and by no means to limit the scope of our invention. Modifications of the conditions of the reaction will, of course modify the results.

For example, an increased space velocity produces an increased hourly yield and an increase in operating pressure has the same effect. A change in the temperature will also effect the rate of conversion of the gases to methanol. Likewise the use of pure carbon monoxide as distinguished from carbon dioxide or a mixture of the two results in an increased methanol percentage in the condensate.

*Example I.*

160 grams chromium nitrate $$(Cr(NO_3)_3.9H_2O)$$

are dissolved, with heating in 60 c. c. water. After the solution has cooled 10 grams zinc chloride and 96 grams ferric nitrate are added. To the resulting cold solution 100 grams zinc oxide are then added with constant stirring. The resulting wet mass is heated in a porcelain evaporating dish to dryness and then placed in a copper crucible in which it is heated over a Fletcher burner to drive off the nitrogen peroxide fumes.

The material thus obtained is crushed sufficiently to pass a 65 mesh screen and to it 8.2 grams zinc chloride dissolved in 60 c. c. water are added. The product thus obtained hardens spontaneously and is olive green in color.

The yields of methanol condensate obtained with this catalyst when a gas mixture comprising 16–17% carbon monoxide and 84–83% hydrogen is passed thru 1 liter of catalyst granules at a space velocity of 20,000–75,000, at a pressure of 2000 pounds per square inch and at a temperature of 400–420° C. will be about 400–950 c. c. of condensate per hour, which analyses 87.6–95.4% by volume of methanol.

*Example II.*

7.2 kilograms chromium nitrate $$Cr(NO_3)_3.9H_2O$$

and 4.3 kilograms ferric nitrate are dissolved in 5 liters of water by heating in a large porcelain evaporating dish on a steam bath. 450 grams zinc chloride (which may contain 0.0002% arsenic) are then dissolved in this solution.

Separately there is made up a suspension of 4.5 kilograms zinc oxide (which may contain traces of chlorides and heavy metals slightly in excess of U. S. P. limit) in 11 liters of water. By stirring this suspension well and breaking up by hand any lumps that form, a practically complete suspension is obtained. To this suspension there is slowly added with vigorous stirring the above solution of salts. A thick pasty mass is formed which is spread out in a thin layer to dry and harden. To accelerate this process, a current of air from an electric fan may be allowed to play on the surface of the mass. On the following day, the hardened mass is broken up and placed in a furnace consisting of an alundum tube inside of which is placed a sealed copper vessel which contains the catalyst and thru which a current of gas composed of 15–25% carbon monoxide and 85–75% hydrogen is passed. The mass is heated until the temperature registered by a pyrometer placed in the center of the copper vessel reaches approximately 350° C. and the heating continued at this temperature until nitrogen peroxide fumes are no longer given off.

When a gas mixture comprising 10–60% carbon monoxide and 90–40%—hydrogen is passed over this catalyst at a temperature of 400–420°C. at a space velocity of 20,000–40,000, and at a pressure of 3200–3500 pounds per square inch, from 1.5 to 2.5 liters of condensate per hour per liter of contact mass, analyzing 93.0–97.2% by volume of methanol, are obtained.

*Example III.*

When a gas mixture comprising 25% by volume carbon dioxide and 75% by volume hydrogen is passed over the catalytic mass prepared as described in Example II above, at a temperature of 385–400° C. at a space velocity of 20,000–40,000, and at a pressure of 3500 pounds per square inch, a yield of 2.0–4.0 liters of condensate per hour per liter of catalyst, analyzing 65% by volume of methanol, is obtained.

It will be noted that in both of the herein described specific examples, the catalyst mass, as finally prepared for use, comprises zinc oxide, chromium oxide, iron oxide, and zinc chloride. In the case of Example I, the nitrates of chromium and iron were decomposed to the oxide by simple heating of the dry mass. In the case of Example II, this reduction was accomplished by means of a mixture of carbon monoxide and hydrogen. The effect on the composition is the same in both treatments.

Broad claims relating to the use of mixtures of difficultly reducible oxides with oxides of iron group metals and metallic halides as methanol catalysts have been presented in our Serial Application 111,884 filed May 26, 1926, hence only specific claims are presented herein.

Now having described our invention we claim the following as new and novel:—

1. A methanol catalyst initially comprising zinc oxide, chromium oxide, iron oxide and zinc chloride.

2. A methanol catalyst prepared by combining 4500 grams zinc oxide, 7200 grams chromium nitrate $(Cr(NO_3)_3 \cdot 9H_2O)$, 4300 grams ferric nitrate and 450–820 grams zinc chloride in aqueous mixture, and converting the nitrates to oxides.

3. A methanol catalyst prepared by combining 26.7–27.3% zinc oxide, 42.9–43.9% chromium nitrate $(Cr(NO_3)_3 \cdot 9H_2O)$, 25.6–26.1% ferric nitrate, and 4.8–2.7% zinc chloride in aqueous mixture, and converting the nitrates to oxides.

4. A process for the preparation of a methanol catalyst which comprises adding an aqueous solution consisting of chromium nitrate $(Cr(NO_3)_3 \cdot 9H_2O)$, ferric nitrate and zinc chloride to an aqueous suspension of zinc oxide, obtaining the resultant mixture in the form of a dry hardened mass, and heating the said mass to convert the nitrates to oxides.

5. A process for the preparation of a methanol catalyst which comprises adding an aqueous solution consisting of 42.9–43.9% chromium nitrate $(Cr(NO_3)_3 \cdot 9H_2O)$, 25.6–26.1% ferric nitrate and 4.8–2.7% zinc chloride to an aqueous suspension containing 26.7–27.3% zinc oxide, obtaining the resultant mixture in the form of a hardened mass and heating the said mass in a current of hydrogen to a temperature of approximately 350° C until nitrogen peroxide fumes are no longer given off.

6. A process for the production of synthetic methanol which comprises passing a mixture of hydrogen and oxides of carbon at a pressure in excess of 2000 pounds per square inch and at a temperature above 250° C. over a catalyst initially comprising zinc oxide, chromium oxide, iron oxide, and zinc chloride, cooling the reacted gases, and recovering the resultant methanol.

7. A process for the production of synthetic methanol which comprises passing a mixture of hydrogen and oxides of carbon at a pressure in excess of 2000 pounds per square inch and at a temperature to 385–420° C. over a catalyst initially comprising zinc oxide, chromium oxide, iron oxide, and zinc chloride, cooling the reacted gases, and recovering the resultant methanol.

In testimony whereof we affix our signatures.

JOHN C. WOODRUFF.
GROVER BLOOMFIELD.